Patented Aug. 2, 1938

2,125,387

UNITED STATES PATENT OFFICE 2,125,387

PROTECTIVE COATING

Martin W. Mason, Nutley, N. J., assignor to Pittsburgh Plate Glass Company, a corporation of Pennsylvania No Drawing. Application October 2, 1936,
Serial No. 103,770

9 Claims. (Cl. 91—70)

The present invention relates to protective coatings and has particular relation to the provision of coatings suitable for the protection of the surfaces of relatively reactive metals from the corrosive action of oils, fats, greases, alcohol, foodstuffs, beverages, moisture, chemicals and other corrosive or chemically active materials.

One object of the invention is to obviate the relatively expensive tinning or galvanizing operation heretofore required to protect the surfaces of such reactive metals as iron from attack by the various agencies of corrosion including those herein enumerated.

A second object of the invention is to provide a simple and economical method of so treating surfaces of iron, zinc and such like metals as to render the surfaces susceptible of receiving and retaining lacquer-like coatings of certain chemically resistant and insoluble vinyl resins whereby to obviate chemical attack upon or solution of the metal by the resin or the constituents thereof.

A third object of the invention is to provide a non-porous and impermeable coating for iron or steel receptacles and apparatus which will prevent contact and contamination or impairment of foods, beverages and other materials by contact with the metal.

A fourth object of the invention is to provide a method of so treating iron and zinc surfaces that they will receive a relatively permanent and impermeable coating of vinyl resin without use of priming coatings of varnish.

These and other objects will be apparent from consideration of the following specification and the appended claims.

Modern civilization has been characterized by enormous expansion in the use of metals, particularly of iron, alloys of iron, and zinc which are mechanically relatively strong, but chemically susceptible to attack by numerous agencies of corrosion. Much research work has been devoted to perfection of suitable coatings for the protection of the metals from these agencies. Numerous processes involving the coating of the metals with various paints and lacquers or the plating or galvanizing or tinning of the surfaces with more resistant and more expensive metals have been employed or suggested.

The problem of providing resistant coatings on iron or its equivalent, steel, zinc, or the like, has not, heretofore, been satisfactorily solved. This was especially true in the case of containers of the type of sheet iron or steel cans or drums used in the storing of edible or potable products, fats, oils, chemical products and the like. Tin, in the form of a thin plate applied by contacting iron or steel with the molten tin has, heretofore, been regarded as one of the most nearly satisfactory coatings and long enjoyed use in the field of food containers of the "can" type almost to the exclusion of other coating materials. However, even tin is not entirely satisfactory for a number of reasons. Firstly, it is relatively expensive and available supplies are limited. Moreover, to be economically feasible, it must be applied as a very thin film. These films are microscopically porous and corrosive liquids soon penetrate or permeate them and attack the metal to which they are applied, and the products become contaminated by the metal. In the case of some foodstuffs and beverages, such as beer and alcoholic liquors, this contamination often produces objectionable tastes or otherwise leads to deterioration of the product.

Because of these defects, tin coated containers could not successfully be used for storing these products and accordingly they were kept in glass containers, which were heavy, bulky and breakable.

It has been proposed to substitute lacquer-like coatings of various organic resins for the tin coatings, but heretofore no particularly successful material of this type has been obtained. For example, phenolic resins which have been applied to containers of food and beverages are found to impart a distinct and objectionable taste thereto. Moreover, in order to overcome brittleness of the Bakelite resin, it is necessary to incorporate it with plasticizers or vegetable oils. These oils tend to impart objectionable tastes to materials with which they contact. They also tend to leech out of the Bakelite leaving the resin in unplasticized state. Liquids in time permeate through the Bakelite films and contact the metal underneath. Glyptal or alkyd type resins are objectionable for similar reasons.

It has been observed that certain resins obtained by the condensation of compounds containing unsaturated bonds and known as vinyl resins, are highly resistant to attack and permeation by most chemically active materials. Unfortunately, these vinylite resins can not successfully be employed in the coating of containers and other metallic articles which are exposed to the action of these reactive products because the resins possess practically no bonding power with iron, steel, zinc and other metals commonly employed in the manufacture of the containers. Indeed, the resin or certain constituents thereof tends to react with or decompose upon contact with the metal. If tinned surfaces be given a baked priming coating of certain unplasticized varnishes which are found to have the power of adhering to tin, they will receive and retain the vinyl resin. However, such process is highly expensive because there must first be applied a coating of tin which it is desirable to eliminate. Secondly, the tin must be given one or more coatings of the unplasticized varnish or lacquer. Finally, the lacquer coating must receive the coating of vinyl resin.

Such coatings after application are often far from perfect. Bubbles and other imperfections sometimes occur in the priming coating. Moreover the unplasticized varnish used as a priming coating is often rather brittle and as a result, cracking and peeling may occur. Imperfections in the priming coatings from any of these causes will result in premature failure of the vinylite outer coating as a sealing medium between the metal and the material in contact therewith.

The present invention is based upon the discovery that iron, steel, zinc, and the like metallic surfaces, when treated with a phosphate of a suitable metal, become highly receptive to coatings of vinylite resins, notably so-called vinylite H resins, which contain a co-polymer of vinyl acetate and vinyl chloride. Such resins are highly insoluble, inert, and do not impart tastes or odors to foods and beverages that come into contact with them.

Substantially any of the conventional processes of chemically or electro-chemically treating metals with phosphates, employed in the rust proofing of iron or steel, may be applied in the practice of the invention. However, particularly satisfactory results have been obtained by use of a process involving the application of a phosphate, e. g., zinc phosphate, to a metal surface by means of a reversible or alternating electric current. Such processes are designated in commercial parlance as "Granodizing". The operation may be conducted as follows:

A "black iron", which may be in the form of a metallic sheet or in any other form is first thoroughly cleaned of any greases, oils, etc. by conventional methods of washing, pickling or by buffing. The thoroughly clean metal is then placed in a suitable bath containing a phosphate of a metal such as zinc, iron, cadmium, calcium, nickel, cobalt, manganese, or mixtures of two or more thereof. A satisfactory bath may be prepared by the addition of 0.15 lb. of zinc oxide and 0.05 gallon of ortho phosphoric acid to water to make up 1 gallon of electrolyte, to which is added about .04 pound of sodium nitrite. The bath is preferably heated to a temperature of about 160 deg. F. to 200 deg. F. and the articles to be treated are immersed therein. Suitable electric connections are provided for the articles and an alternating current of about fifty amperes per square foot of exposed metal surface is passed through the bath. The articles, of course, function as one pole of the electrolytic cell. The term "alternating current" denotes any current of electricity which is reversed one or more times during the course of treating the metal.

It is to be understood that the proportion of ingredients in the bath, the temperature of the bath, and the current density employed in conducting the electrolytic treatment may vary over a relatively wide range. Electrolysis is continued until a coating of sufficient thickness and uniformity is obtained. There is no danger of damaging the surface by reason of overtreatment because equilibrium is soon reached and further passage of current does not produce any substantial change in the surface. In general, a period of 4 or 5 minutes is sufficient for the operation. The various phases of the process are discussed in greater detail in British Patent No. 435,773.

Treatment of the surfaces of the metal by application of an alternating current produces particularly satisfactory results not equalled by most methods of phosphatizing. However, substantially any of the other known methods (chemical or electro-chemical) which give a reasonably uniformly treated surface may be employed. Many such processes are available. The following United States patents contain examples of a few of them: 870,937, 1,007,069, 1,791,715, 1,869,121.

Vinylite resin coatings are of particular value for the protection of various containers, including tin cans, drums, tanks, and tank cars employed in the storage and shipment of chemicals, oils, fats, alcohol, foods, beverages, and the like. In some cases, reaction vessels employed in the preparation of chemical materials may similarly be treated. The application of the coatings is not limited to containers, but also extends to any metallic articles which it may be desired to protect from corrosion or weathering. For example, structural steels, either plain or galvanized, may be given preliminary treatment with a suitable phosphate of a metal and then coated with vinylite H resin in order to obtain a product which is highly resistant to weathering and to the action of various destructive fumes and vapors which are common in and about chemical plants. Articles partially or completely coated with zinc and articles formed of zinc by coating or other methods may also be so coated.

Containers and such like articles suitable for coating with vinyl resins may be fabricated by various methods, including casting, stamping, spinning, and extruding. Sheets of metal may likewise be cut into blanks, the edges of which are welded, brazed, or riveted. If the container is not to be subjected to excessive strain, and if the contents are not particularly fluid, satisfactory unions may be obtained by merely crimping together the edges of the sheets. Soldering also constitutes a method of uniting the edges of sheet metals, such as iron or steel. However, if soldering is to be employed, the edges of the metal preferably should be preliminarily dipped in a bath of molten tin in order to render them receptive to solder. Excess of any fluxes employed in promoting the soldering should be carefully removed from the metal prior to the phosphate treatment.

In the manufacture of tin cans or other sheet metal receptacles, a tube may be formed by extrusion or by electrically welding the edges of a blank and then applying a bottom by electric welding or other convenient method. The edges of the receptacle should be dipped in molten tin to provide a thin coat to act as a base to which the packer can solder a cover after the receptacle has been filled. A cover suitable for application to the receptacle by soldering is obtained by coating a blank with tin, applying a priming coating of baked varnish and then applying a resistant coating of vinylite H resin.

Containers and other articles after fabrication are given phosphate coatings, for example, by the methods already described, are washed with cold water and then with hot water, and dried. They are then ready for the application of the vinylite coatings. Substantially any of the vinyl resins will adhere satisfactorily to the treated surfaces. Examples of such resins are polymerized vinyl acetate, vinyl chloride (polymerized) and polymerized vinyl benzene. Physical mixtures of these resins in varying proportions may be employed. However, the copolymer obtained by polymerizing a mixture of vinyl acetate and vinyl chloride, known as vinylite H, is particularly satisfactory. This material is highly resistant to chemical action of, and to permeation and solution by, most agencies. When applied to metals which have been preliminarily treated with a phosphate of the metal, excellent adhesion is obtained. Coatings of this resin when applied to the same surfaces without phosphate treatment will scale off almost immediately upon drying and can be blown away by a blast of air.

The preparation of vinylite H resins suitable for use in the present process is discussed in detail in United States Patent Nos. 1,990,685 and 1,935,577. Other methods of preparation are also applicable. The ratio of vinyl acetate to vinyl chloride may vary over a considerable range, but a product containing about 13 parts of vinyl acetate to 87 parts of vinyl chloride has been found to produce excellent results.

Any convenient mode may be employed in the application of the resin to the phosphate treated metal. Common methods involve spraying, brushing, dipping, and rolling. If a very heavy coating is to be employed, it may even be desirable to apply pre-formed sheets or films to the surfaces of the metal. Adhesion of such sheets may be obtained by the application of a solution of resin to the surface of the metal and to the sheet or to either. An equivalent procedure would involve wetting of the surface of a sheet with a solvent in order to render it adhesive. Relatively thick films of the vinyl resin may also be obtained by application of a plurality of coatings of a solution of the resin.

Conventional solvents for vinylite H resins may be employed in the preparation of the solutions. Examples of such solvents are ethylene dichloride, acetone or other ketones, and the like. These, if desired, may be diluted with toluene or benzene, or similar hydrocarbons. The proportion of solvent employed in preparing a solution of the resin may vary over a relatively wide range, and will depend upon the fluidity desired in the product. This in turn will be to a considerable extent controlled by the mode employed in the application of the resin to the metal. In general, a composition containing about 12 per cent of resin and about 88 per cent of solvents is satisfactory for spray. The vinylite H coatings, after application, may be baked at a temperature of about 400 deg. F., for about eight minutes in order to set and harden them.

Conventional prints may be applied to the exteriors of the cans, or they may be lacquered, lithographed, or otherwise coated in any way which may be desired. Roll coating provides a convenient method of finishing the cans.

In some cases, especially if extreme resistance to the action of permeation by chemical agencies is not required, the vinylite H resin may be admixed with from 5 to 60 per cent or more of another vinyl type resin, such as polymerized vinyl acetate or vinyl benzene. Other resins which are compatible with vinylite H may also be employed. For some applications, plasticizers, including phthalic acid esters, such as dibutyl or diamyl phthalate, ethylene-glycol-mono-butyl-ether phthalate may be added. Colors and pigments, such as titanium dioxide and blanc fixe, may also be included, if desired.

It has also been discovered that vinylite resins, notably vinylite H, will adhere readily and permanently to metals, such as iron, if the latter are given a preliminary treatment with chromic acid or a dichromate of a metal, such as zinc, copper, etc. One convenient process of this type is known as the "Cromodine" process and involves the use of an activator, such as sodium chloride, or ferrocyanide. Details of the process are described in Canadian Patent No. 357,584. Vinylite H resin may be applied to metal by the methods described in connection with phosphate treated metals. Phosphates or chromates of any of the metals described in British Patent No. 435,773 or Canadian Patent No. 357,584 may be employed in conducting the treatment.

The advantages involved in the present process of coating metals are numerous. For example:

The vinylite coatings are odorless, tasteless, and resistant to chemical deterioration. When applied to phosphate or chromate treated metals, they adhere with great tenacity. Note: The phosphate and chromate surfaces will not stand flexing action.

The phosphate or chromate treatments cost but little and are well adapted for mass production. Such uniformity in treatment is readily attained that probability of the vinylite coatings contacting with untreated or imperfectly treated metal is negligible.

By employment of the process, the use of tin coatings and priming coatings, with their attendant costs and inconvenience, are obviated.

Vinylite applied over treated metal in offering excellent resistance to corrosion affords a very fine protective coating for machines and general equipment in chemical plants, mines, ships, etc.

Certain desirable forms of the invention have been described, but these are only exemplary. Numerous modifications may be made therein without departure from the spirit of the invention or the scope of the appended claims.

What I claim is:

1. A method of providing stable coatings of resins obtained by polymerizing vinyl chloride upon the surfaces of bodies of ferrous metal which normally tend to decompose the resin, that comprises preliminarily phosphatizing the surfaces, applying a film of the resin to the surfaces and then baking the film.

2. A method of providing stable coatings of a resin comprising the co-polymer of vinyl acetate and vinyl chloride upon the surfaces of ferrous metals which normally tend to decompose and blacken the resin, which comprises preliminarily phosphatizing the surface of the metal, then applying a film of the resin to the surfaces.

3. A process as defined in claim 1 in which the phosphatization is effected by dipping the surfaces into a solution of a soluble salt of phosphoric acid and a metal, and passing an alternating current of electricity through the surfaces and the solution.

4. A process as defined in claim 1 in which the phosphatization of the surfaces is effected by dipping them into a solution of zinc phosphate and passing an alternating current of electricity through the surfaces and the solution.

5. A process as defined in claim 2 in which phosphatization is effected by dipping the surfaces into a solution of zinc phosphate and passing an alternating current of electricity through the solution and the surfaces.

6. A process of providing stable coatings of the co-polymer of vinyl acetate and vinyl chloride upon the surfaces of ferrous metals that normally tend to decompose and blacken the co-polymer which comprises preliminarily treating the surface with a material selected from a group consisting of soluble chromic acid salts, chromic acid, soluble phosphoric acid salts and phosphoric acid, then applying to the surface a film of the co-polymer and baking the film.

7. A process of forming stable coatings of a co-polymer of vinyl acetate and vinyl chloride upon a body of ferrous metal that normally tends to decompose the co-polymer, which comprises preliminarily treating the body with a solution of a material containing a soluble chromate ion, then applying to the body a film of the co-polymer and baking the film.

8. A composite body comprising a stable film of a co-polymer of vinyl acetate and vinyl chloride upon a backing of ferrous metal that normally tends to decompose the co-polymer, the metal having been rendered inert with respect to the resin by preliminarily phosphatizing it.

9. A process of preventing the decomposition of baked coatings of the co-polymer of vinyl acetate and vinyl chloride upon ferrous metal surfaces which comprises electrolytically phosphatizing the surface of the metal prior to the application of the resin coating.

MARTIN W. MASON.